United States Patent
Bigelow

(10) Patent No.: US 9,302,791 B2
(45) Date of Patent: Apr. 5, 2016

(54) TRANSPORT LANDING VEHICLE

(71) Applicant: Bigelow Aerospace LLC, Las Vegas, NV (US)

(72) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 274 days.

(21) Appl. No.: 14/121,596

(22) Filed: Sep. 22, 2014

(65) Prior Publication Data

US 2015/0090841 A1 Apr. 2, 2015

Related U.S. Application Data

(60) Provisional application No. 61/960,949, filed on Oct. 1, 2013.

(51) Int. Cl.
| | | |
|---|---|---|
| *B64G 1/26* | (2006.01) | |
| *B64G 1/60* | (2006.01) | |
| *B64G 1/12* | (2006.01) | |
| *B64G 1/40* | (2006.01) | |
| *B64G 1/10* | (2006.01) | |

(52) U.S. Cl.
CPC .. *B64G 1/26* (2013.01); *B64G 1/12* (2013.01); *B64G 1/60* (2013.01); *B64G 1/402* (2013.01); *B64G 2001/1071* (2013.01)

(58) Field of Classification Search
CPC .............. B64G 9/00; B64G 1/00; B64G 1/60; B64G 1/16; B64G 1/12; B64G 1/26; B64G 2001/1071
USPC .......... 244/158.1, 159.4, 171.1, 171.2, 171.3, 244/171.9, 158.9
See application file for complete search history.

(56) References Cited

U.S. PATENT DOCUMENTS

| | | | | |
|---|---|---|---|---|
| 3,537,668 A | * | 11/1970 | Kosmo | B64G 1/12 114/335 |
| 3,662,973 A | * | 5/1972 | Paine | B64C 39/026 244/1 R |
| 4,685,535 A | * | 8/1987 | Bush | B64G 9/00 182/223 |
| 8,408,488 B2 | * | 4/2013 | Leaver | B64C 27/20 244/12.2 |
| 8,991,764 B2 | * | 3/2015 | Auger | B64G 1/16 244/158.4 |
| 2008/0023587 A1 | * | 1/2008 | Head | B64G 1/10 244/158.4 |
| 2009/0108135 A1 | * | 4/2009 | Shaw | B64G 3/30 244/158.3 |
| 2009/0206204 A1 | * | 8/2009 | Rosen | B64G 1/16 244/158.5 |
| 2012/0298796 A1 | * | 11/2012 | Carreker | B64G 1/22 244/100 R |
| 2015/0151855 A1 | * | 6/2015 | Richards | B64G 1/24 244/164 |

FOREIGN PATENT DOCUMENTS

WO    WO 2015031699 A2 *  3/2015  ............... B64G 1/24

OTHER PUBLICATIONS

Document from http://www.hq.nasa.gov/pao/History/SP-4205/ch3-5.html "Chariots for Apollo", subject matter from 1961.*

* cited by examiner

*Primary Examiner* — Benjamin P Lee
(74) *Attorney, Agent, or Firm* — Gibbs & White P.C.; Franklin E. Gibbs

(57) ABSTRACT

A transport landing vehicle for transferring an astronaut to and from an extraterrestrial mass such as a moon, asteroid, or small planet is disclosed. The transport landing vehicle has a cage that is substantially open to the outside environment.

1 Claim, 3 Drawing Sheets

TRANSPORT LANDING VEHICLE

RELATED APPLICATIONS

This application claims priority under 35 U.S.C. §119 to U.S. Provisional Application No. 61/960,949 filed on Oct. 1, 2013, the contents of which are incorporated herein by reference in its entirety.

FIELD OF THE INVENTION

This invention generally relates to a transport landing vehicle for use on an extraterrestrial mass to transport astronauts to and from the surface of the mass.

BACKGROUND OF THE INVENTION

The Earth's atmosphere and gravity present several issues for spacecraft launched from, or landing on, Earth. For example, it is necessary to achieve a high velocity to escape Earth's gravitational pull. Objects traveling at high velocities in Earth's atmosphere experience significant resistance and friction. As a result, special geometries and heat shielding is required. This also true of spacecraft reentering Earth's atmosphere. If the heat shielding or the geometries are not precise, then the spacecraft could experience a catastrophic failure. However, not all extraterrestrial masses share characteristics of Earth's atmosphere.

Extraterrestrial masses such as a moon, asteroid, or small planet, often have little if any atmosphere and far less gravity that Earth. These variations afford a unique opportunity to develop a class of spacecraft that have less mass and are not bound by the strict geometry of spacecraft launched from Earth. Moreover, the new type of spacecraft can be custom tailored to the needs of habitable bases located on these masses.

What is needed is a transit craft that can act as a transport landing vehicle for astronauts to and from the surface of an extraterrestrial mass.

SUMMARY OF THE INVENTION

A transport landing vehicle for transferring an astronaut to or from an extraterrestrial mass is disclosed. There is an astronaut housing comprised of a cage having a top and a bottom, a plurality of side panels attached to the cage, at least one stand within the cage, and a control panel within the cage. The cage is substantially open to the environment of the extraterrestrial mass.

There is also a body having an outer surface, a top, a bottom, and a door for astronauts to enter into the body. There is an access port through the top of the body and the access port is aligned with an access port through the bottom of the cage for the astronaut to transition from the inside of the body to the cage.

A plurality of landing gears are disposed on the outer surface of the body and there are a plurality of thrusters disposed on the outer surface of the body.

A plurality of fuel containers are also disposed substantially on the outer surface of the body. On the bottom of the body is a nozzle.

In operation, an astronaut enters the body through the door, transitions into the cage and is secured to the stand, and operates the control panel for launching the transport landing vehicle.

BRIEF DESCRIPTION OF THE DRAWINGS

The invention is generally shown by way of reference to the accompanying drawings in which.

DETAILED DESCRIPTION OF THE INVENTION

Figure 1:
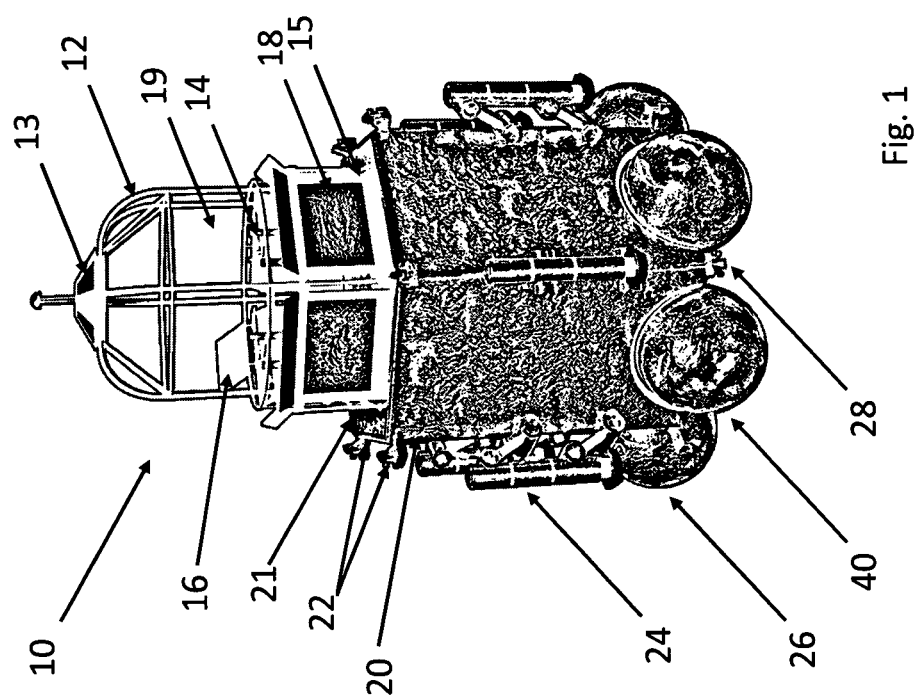
FIG. 1 is a side view of the transport landing vehicle.

FIG. 1 is a side view of the transport landing vehicle 10. There is a cage 12 connected to a number of panels 18. The cage 12 is substantially open the outside environment whether it is an extraterrestrial mass, space, or the inside of a larger spacecraft. In one embodiment, the cage is a skeletal type structure. Within the cage is at least one stand 14 for supporting an astronaut during flight. The stand 14 can include securing means such as straps to hold the astronaut in place. There is also a control panel 16 within the cage 12. The cage also has a top 13 and bottom 15.

The control panel 16 allows the astronaut to monitor and operate the transport landing vehicle. There is also a computer operated mode that involves navigational operations such as stabilization and control of acceleration and direction. In one embodiment, an astronaut could choose a variety of manual and computer assisted functions from the control panel. The control panel 16 can display the status of the vehicle including the amount of fuel and oxidizer available, results of diagnostic testing, landing gear status, and other mission information. The cage and panels form an astronaut housing 19. The bottom of the housing has an access port.

The transport landing vehicle 10 can also operate remotely through the use of communications equipment and a radar coupled to a computer. The housing is attached to the body 20 of the transport landing vehicle 10. The body 20 has a top 21 and bottom 40. There are several fuel and oxidizer containers 26 attached to substantially the outside of the body 20. The fuel and oxidizer is provided to a number of maneuvering thrusters 22 and the nozzle 28. The maneuvering thrusters 22 assist directing the vehicle during flight as part of means to conform to a flight plan and to stabilize the vehicle in connection with means such as a gyroscope. The nozzle 28 provides the primary containers thrust to launch the vehicle 10.

There are also several landing gears 24 on the outside of the body 20. In one embodiment, the landing gears can be transitioned from an inflight state to a deployed state for landing. In other embodiments, the landing gear may remain in substantially one state that does not need to be transitioned to an inflight state.

Figure 2:
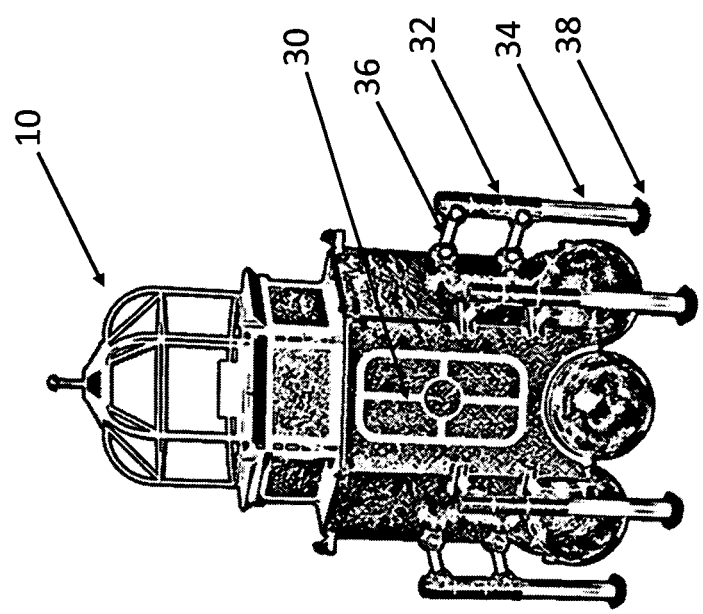
FIG. 2 is another side view of the transport landing vehicle.

Turning to FIG. 2, the transport landing vehicle 10 also has a door 30. In operation, an astronaut enters the door 30 to access the interior of the body 20. Then the astronaut moves through an access port in the top of the body that is in alignment with an access port in the bottom of the housing 19. In one embodiment, the inside of the body could would have a ladder for the astronaut to use to move into the astronaut housing 19. Once inside the astronaut housing, the astronaut is secured to a stand 14. In one embodiment, the astronaut could be secured using straps.

FIG. 1 identifies an embodiment where the landing gears 24 are retracted for flight and FIG. 2 illustrates the landing gears 24 being extended for landing. In this embodiment, there are armatures 36 that act to extend and retract a first strut 32 and a second strut 34 and the second strut has a pad 38. Further identified in this embodiment, the second strut 34 fits within the first strut 32.

In operation of this embodiment, the overall strut length is varied to level the transport landing vehicle on a surface such as an extraterrestrial mass. This can be accomplished by numerous means such as springs and hydraulics.

In another embodiment, there could be a gate like structure as part of the cage 12 that could be opened and used with a ramp for the Astronaut to use to access the astronaut housing 19. In this fashion the inside of the body could be used to transport supplies and equipment.

Figure 3:
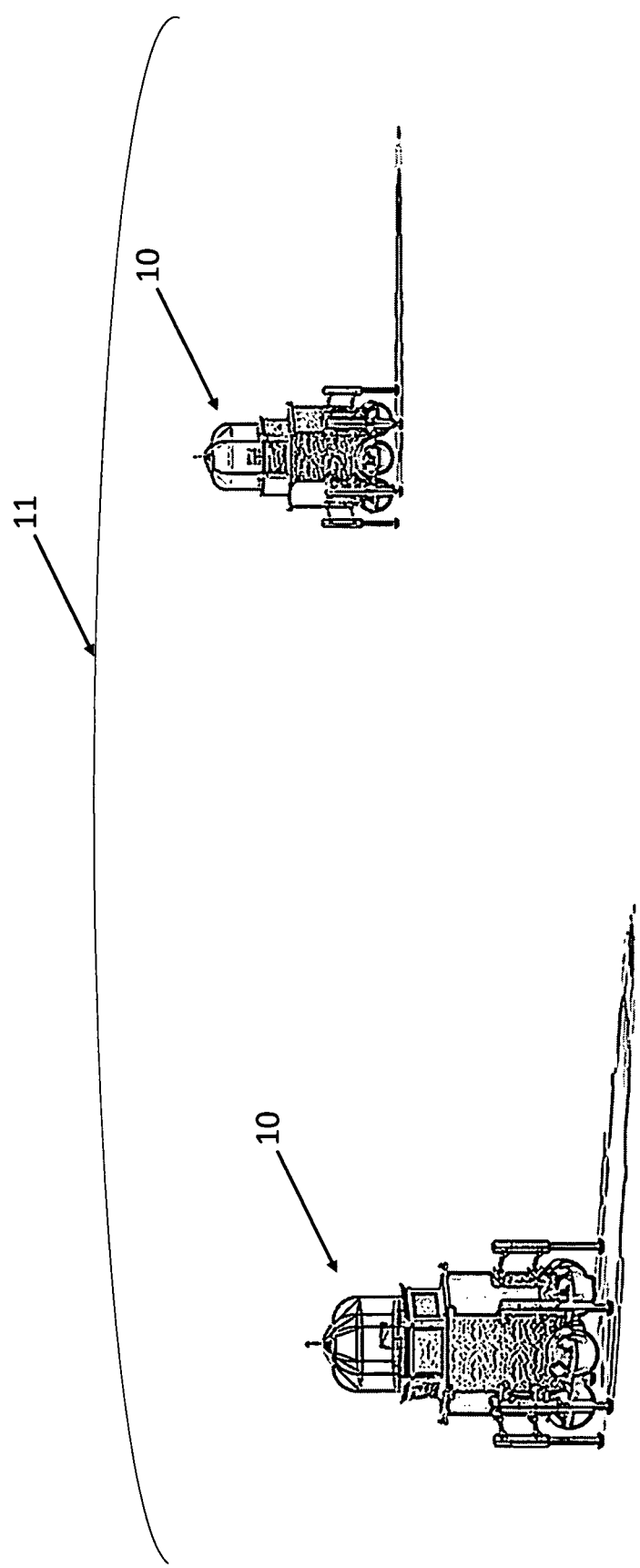
FIG. 3 is a view of transport landing vehicle having landed on an extraterrestrial mass.

FIG. 3 illustrates two transport landing vehicles on an alien landscape. The horizon of the landscape 10 is visible.

The size of the transport landing vehicle 10 can vary to accommodate a number of astronauts and supplies. The preferred embodiment is a size to house for astronauts.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A transport landing vehicle for transferring an astronaut to or from an extraterrestrial mass comprising:
   an astronaut housing comprised of a cage having a top and a bottom, a plurality of side panels attached to the cage, at least one stand within the cage, a control panel within the cage, and the cage being substantially open to the environment of the extraterrestrial mass;
   a body having an outer surface, a top, a bottom, and a door for astronauts to enter into the body, an access port through the top of the body and aligned with an access port through the bottom of the cage for the astronaut to transition from the inside of the body to the cage;
   a plurality of landing gears disposed on the outer surface of the body;
   a plurality of maneuvering thrusters disposed on the outer surface of the body;
   a nozzle disposed on the bottom of the body; and
   a plurality of fuel and oxidizer containers disposed substantially on the outer surface of the body for supplying fuel and oxidizer to the maneuvering thrusters and nozzle;
   wherein, an astronaut enters the body through the door, transitions into the cage and is secured to the stand, and operates the control panel for launching the transport landing vehicle.

* * * * *